INTEGRATED SEMICONDUCTOR DIODE MATRIX

Filed May 28, 1964 2 Sheets-Sheet 1

INVENTOR.
RABAH A. SHAHBENDER
BY
W. S. Hill
Agent

INTEGRATED SEMICONDUCTOR DIODE MATRIX

Filed May 28, 1964 2 Sheets-Sheet 2

INVENTOR.
RABAH A. SHAHBENDER
BY
W.S. Hill
Agent

United States Patent Office 3,399,390
Patented Aug. 27, 1968

3,399,390

INTEGRATED SEMICONDUCTOR DIODE MATRIX

Rabah A. Shahbender, Princeton, N.J., assignor to Radio Corporation of America, a corporation of Delaware Filed May 28, 1964, Ser. No. 371,017
11 Claims. (Cl. 340—174)

This invention relates generally to integrated structures of semiconductor material, and more particularly to a novel integrated circuit for a switching matrix of the type used to address a memory in a computer system. The integrated circuit of the present invention is particularly useful for addressing a magnetic memory of the type described in the U.S. patent application for Memory Systems, Ser. No. 209,013, filed July 11, 1962, now Patent No. 3,229,266, by Jan A. Rajchman, and assigned to the assignee of the present invention.

It has been proposed to use integrated circuits comprising an array of diodes to address a magnetic memory, in a computer system. Where, however, current has to flow selectively in either of two directions through a magnetic element, it has been suggested previously to provide at least two monolithic integrated switching matrices for each array of magnetic elements. One monolithic integrated matrix comprises a slab of semiconductor material of N-type conductivity with portions of P-type material diffused therein to form P-N junctions, and the other integrated monolithic matrix comprises a slab of P-type material with N-type material diffused therein to form P-N junctions. While the prior art arrangements of integrated diode matrices are suitable for many applications, they are not as compact and easy to manufacture as the integrated circuit of the present invention.

It is an object of the present invention to provide an improved integrated circuit for a switching matrix wherein a single array of similar diodes is connected to provide current selectively in either one of two directions to a utilization device.

It is another object of the present invention to provide an improved integrated circuit that is relatively more compact and easier to manufacture than integrated circuits of the prior art for similar purposes.

Briefly stated, the improved integrated circuit of the present invention comprises an array of semiconductor diodes bonded together by, and insulated from each other by, an insulating material that forms a sheet-like wafer with the array of diodes. Each of the diodes has an electrode exposed on each of the two opposed major surfaces, respectively, of the wafer. The diodes are arranged in a matrix, some diodes having their anode electrodes and other diodes having their cathode electrodes exposed on the same major surface of the wafer. Electrical connecting means are provided on one major surface of the wafer to connect predetermined groups of similarly poled electrodes together, and electrical connecting means are provided on the other major surface of the wafer to connect predetermined pairs of dissimilarly poled electrodes together.

The novel features of the present invention, both as to its organization and method of operation, as well as additional objects and advantages thereof, will be more readily understood from the following description when read in connection with the accompanying drawings, in which similar reference characters represent similar parts throughout, and in which.

Figures 1, 2:
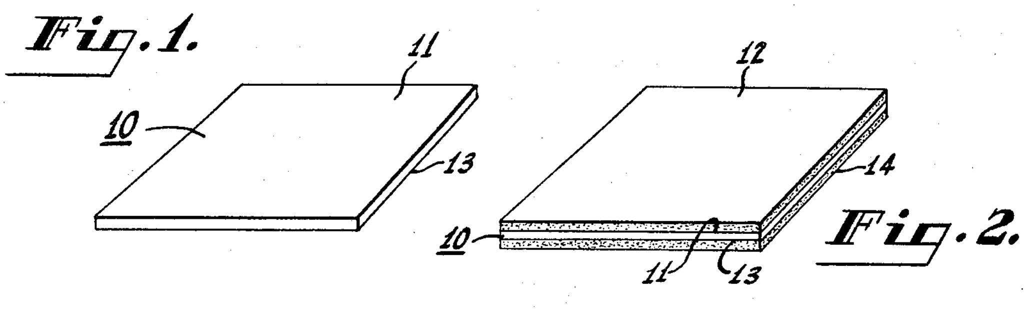
FIG. 1 is a perspective view of a sheet of semiconductor material used in the manufacture of a composite wafer for an integrated circuit of the present invention.
FIG. 2 is a perspective view of a sheet of semiconductor material whose opposed major surfaces have been oxidized.

Referring, now, particularly to FIG. 1, there is shown a sheet 10 of semiconductor material, such as silicon. The sheet 10 is preferably of rectangular shape and is formed from a single crystal of suitably doped semiconductor material, such as N-type or P-type silicon, germanium, or gallium arsenide, for example. The sheet may be about one inch square and about 10 mils thick, for example. The sheet 10 has two, major, opposed, parallel surfaces 11 and 13.

An electrically insulating and physically binding oxide is deposited or formed on the two major surfaces 11 and 13, which, as viewed in FIGS. 1 and 2, are the upper and lower surfaces of the sheet 10, by any suitable method known in the art. For example, the sheet 10 of silicon may be oxidized by heating it in steam, containing air and/or pure oxygen, to a temperature between 1200° C. and 1250° C. until the major surfaces 11 and 13 are covered with upper and lower oxide layers 12 and 14 of a desired thickness, as shown in FIG. 2. When the sheet 10 is of silicon, the oxide layers 12 and 14 are silicon dioxide. A suitable oxide may also be formed on the sheet 10 by heating it in steam containing silicon tetrachloride or in a hydrogen carrier containing silicon tetrachloride and carbon dioxide, in a manner known in the art. Suitable oxides may also be formed on the sheet 10 by the decomposition of organic oxysilane compounds by known techniques. The oxide coated sheet 10 in FIG. 2 is shown with its peripheral edges trimmed so that the silicon sheet 10 can be seen plainly between the oxide layers 12 and 14.

A plurality of oxidized sheets 10 are superimposed on each other to form a stack 16 wherein the upper oxide layer 12 of a sheet 10 is adjacent to the lower oxide layer 14 of the next higher adjacent sheet 10. The number of oxidized sheets 10 in any stack will depend upon the size of the ultimate composite wafer desired. In the stack 16 shown in FIG. 3, four sheets 10 are superimposed on each other.

Figure 3:
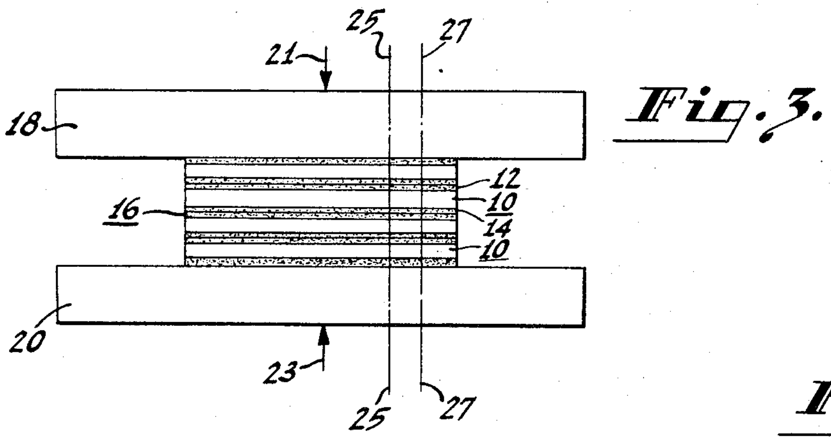
FIG. 3 is a front-elevational view of a stack of oxidized sheets of semiconductor material under pressure in one of the steps in the manufacture of the integrated circuit of the present invention.

The stack 16 is placed between parallel blocks 18 and 20 of graphite to prevent scratching of the oxide layers, and the entire assembly is placed in a press (not shown) wherein the stack 16 is compressed by forces in the directions normal to the major surfaces of the sheets as indicated by the arrows 21 and 23 in FIG. 3. Depending upon the oxide and the material of the sheet 10, the pressure applied between the blocks 18 and 20 may be from about 100 p.s.i. to about 2,000 p.s.i. While the pressure is applied, the stack 16 is heated, as in an induction furnace (not shown), to a temperature at which the oxide layers 12 and 14 soften, usually between 1200° C. and 1250° C. for silicon, for example. Under these conditions of heat and pressure, adjacent oxide layers 12 and 14 of adjacent sheets 10 in the stack 16 fuse, that is, become bonded, to each other in about three minutes, and the stack 16 becomes an integral structure.

Figures 4, 5:
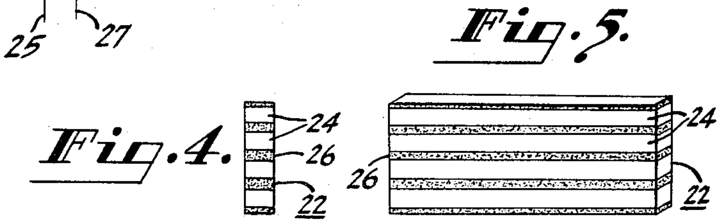
FIG. 4 is an end elevational view of a slice from the stack of fused oxidized sheets in FIG. 3.
FIG. 5 is a side-elevational view, in perspective, of the slice in FIG. 4.

The stack 16 of fused oxidized sheets 10 is now sliced, preferably by cutting the stack 16 perpendicularly to the surfaces of the oxide layers 12 and 14, as shown by the slice 22 in FIGS. 4 and 5. The slice 22 may be one cut by, and included between, the planes indicated by the lines 25 and 27 in FIG. 3. The slice 22 is a composite wafer comprising elongated strips 24 of silicon separated from each other by fused silicon dioxide 26.

Figure 8:
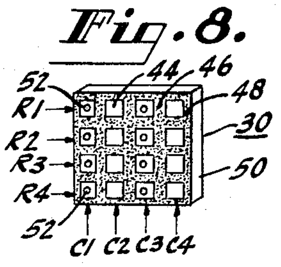
FIG. 8 is a perspective view of a composite wafer obtained by taking a slice through the stack of oxidized slices, illustrated in FIG. 7, after adjacent slices have been fused to each other.

A checkerboard-like composite wafer 30, such as shown in FIG. 8, may be formed from a stack of fused oxidized slices 22 of the type shown in FIGS. 4 and 5. The slices 22 are oxidized by any known means, as by heating them in steam at a temperature between 1200° C. to 1250° C., for example, until oxide layers 34 and 36 of a desired thickness form on the opposite major surfaces, respectively, of each slice 22 (FIG. 6).

Figures 6, 7:
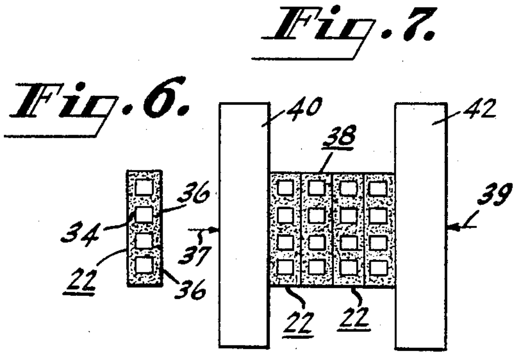
FIG. 6 is an end elevational view of an oxidized slice of the type illustrated in FIG. 4.
FIG. 7 is a front-elevational view of a stack of oxidized slices, of the type illustrated in FIG. 6, under pressure during the manufacture of the composite wafer of the integrated circuit of the present invention.

A plurality of oxidized slices 22 are superimposed on each other to form a stack 38, as shown in FIG. 7. The number of oxidized slices 22 in the stack 38 is a matter of choice, depending upon the size of the composite wafer 30 desired, four oxidized slices 22 being shown in FIG. 7. The stack 38 is disposed between graphite blocks 40 and 42 so that it may be compressed in a press with a pressure of about 1 ton/square inch, in the directions indicated by the arrows 37 and 39, normal to the major surfaces of the slices. The stack 38 is heated to a temperature between 1200° C. to 1250° C., while under pressure until the oxide layers 34 and 36 soften so that adjacent oxidized slices 22 become fused to each other, whereby the stack 38 forms an integral structure.

The stack 38 may now be sliced transversely to (preferably normal to) the major surfaces of the slices 22 to form a plurality of checkerboard-like composite wafers 30 (FIG. 8) wherein discrete pieces 44 of silicon are separated from each other by fused silicon dioxide 46, and the new major surfaces 48 and 50 of the wafer 30 are normal to those of the original slices 22.

Diodes may be formed in the exposed surfaces of the pieces 44 of doped silicon by any suitable techniques known in the art of integrated circuitry. Thus, for example, by the techniques described in U.S. Patent 2,802,760, issued to L. Derick et al., on Aug. 13, 1957, for Oxidation of Semi-Conductive Surfaces for Controlled Fusion, a diode may be formed in each of the pieces 44 by diffusing a suitabe electron donor or acceptor element (impurity) 52 into an exposed side of each of the pieces 44. Where, for example, the piece 44 is N-type silicon, the diffused element 52 is a P-type (electron acceptor impurity) element, such as boron. If, on the other hand, the piece 44 is P-type silicon, the element 52 diffused therein would be an N-type element (electron donor impurity) such as phosphorous. Thus, the element 52 diffused into a portion of the piece 44 of semiconductor material of one type dopes that material in a manner to make it semiconductor material of an opposite conductivity type, thereby forming a P-N junction so that the piece 44 may now function as a semiconductor diode.

Referring now to FIG. 8, the composite wafer 30 may be described as comprising four columns, C1, C2, C3, and C4, and four rows R1, R2, R3, and R4. The element 52 is diffused in one side of each piece 44 of semiconductor material on one major surface 48 of the wafer 30 in the odd-numbered columns C1 and C3. The element 52 is also diffused in one side of each piece 44 of semiconductor material on the opposite major surface 50 of the wafer 30 in the even-numbered columns C2 and C4. While, in the interest of brevity and clarity, an array of only four columns and four rows of diodes is described for the switching matrix comprising the wafer 30 the diode array may comprise many more columns and rows.

In each of the rows R1 to R4 on the major surface 48 of the wafer 30, the diffused element 52 in each odd-numbered column is connected by an electrical conductor 54 to the semiconductor material 44 in the adjacent even-numbered column. The conductor 54 may be a vapor deposited metal, or may comprise conductive paint, for example. Thus, each conductor 54 connects a pair of diodes in series with each other.

On the other opposite major surface 50 of the wafer 30, each of the pieces 44 of semiconductor material in each of the odd-numbered columns (C1 and C3) is connected to a separate connector 56. Thus, for example, the conductor 56 connects a similar electrode in each of the diodes in an odd-numbered column. The conductors 56 may also be vapor deposited metal, metallic paint, or any other suitable electrical conductor.

In each of the even-numbered columns (C2 and C4) a separate conductor 58 connects only the semiconductor material containing the diffused elements 52 of the diodes. The portion of the piece 44 of semiconductor material other than that in which the element 52 is diffused is insulated from the conductor 58 by any suitable means known in the art, as by an insulating oxide formed on these parts prior to the deposition of the conductor 58.

Figure 9:
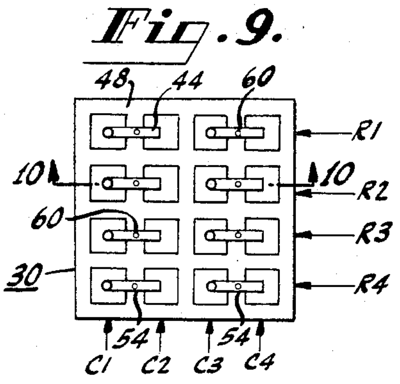
FIG. 9 is an elevational view of the composite wafer showing the integrated circuit of the present invention on one major surface of the composite wafer.
Figure 11:
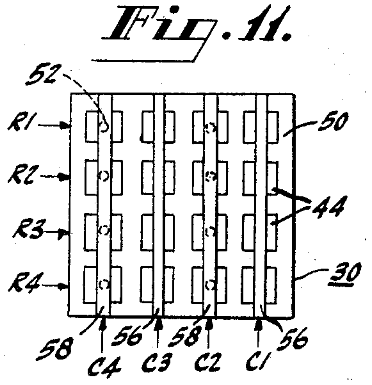
FIG. 11 is an elevational view of the composite wafer showing the integrated circuit of the present invention on the opposite major surface of the wafer to that shown in FIG. 9.
Figure 10:
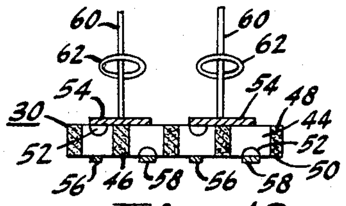
FIG. 10 is a cross-sectional view of the integrated circuit shown in FIG. 9, taken along the line 10—10 and viewed in the direction of the arrows, the integrated circuit being connected to a pair of magnetic elements.
Figure 12:
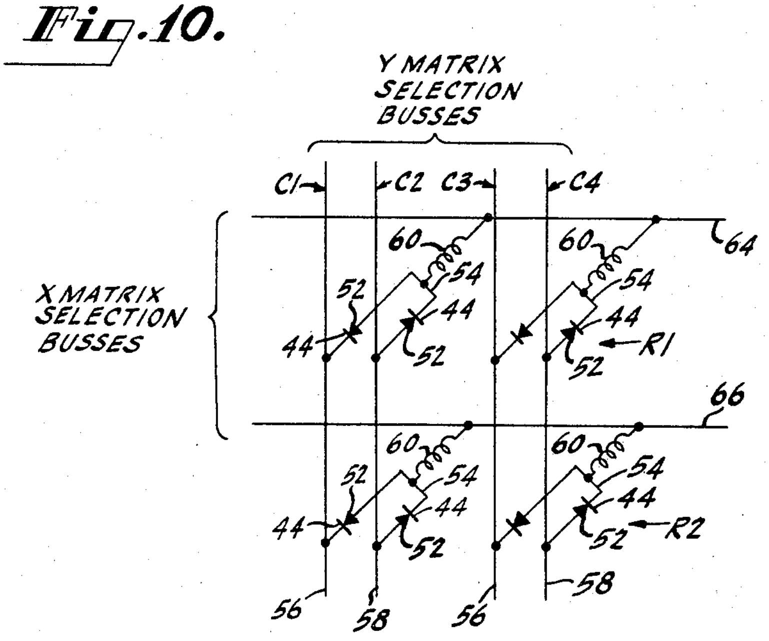
FIG. 12 is a schematic diagram of a portion of a computer system showing the integrated circuitry of the present invention.

Referring, now, to FIG. 12, there is shown a schematic diagram of the circuitry of the integrated diode switch matrix on the composite wafer 30 illustrated in FIGS. 9, 10, and 11. The same reference characters that were used to designate components of the integrated circuit in FIGS. 9, 10, and 11 are used to designate the components' symbols in FIG. 12. The cathode 44 of each diode in FIG. 12 represents the semiconductor material of one conductivity type in a piece 44, and the anode 52 of each diode represents the semiconductor material of an opposite conductivity type in a piece 44. The anodes and cathodes in each of the diodes on the wafer 30 may be interchanged.

In each of the odd-numbered columns C1 and C3 of FIG. 12, a separate conductor 56 connects all of the cathodes 44 of the diodes. In each of the even-numbered columns C2 and C4, a separate conductor 58 connects all of the anodes 52. In each of the rows (such as R1 and R2), each of the anodes of the diodes associated with each of the odd-numbered columns C1 and C3 is connected to each of the cathodes of each of the diodes associated with the even-numbered columns C2 and C4 by means of separate conductors 54, respectively.

Each conductor 54 is connected to a separate winding 60 for a magnetic element 62 (FIG. 10), such as a ferrite toroid. Each winding 60 connected to the diodes in the row R1 has an end connected to a bus 64, and each winding 60 connected to the diodes in the row R2 has an end connected to a bus 66. The busses 64 and 66 may comprise X matrix selection busses of the type used in the computer art, and the conductors 56 and 58 may comprise Y matrix selection busses of the type used in the computer art.

The operation of the switching matrix illustrated in FIGS. 9, 10, 11 and 12 is as follows: By enabling one of any pair of diodes connected by a conductor 54, that is, biasing this diode in a forward direction, and by disabling the other diode in the pair that is, back-biasing this diode, and vice versa, by gating circuitry (not shown) known in the computer art, it can be seen readily that current can be controlled through any winding 60 in either one of two opposite directions, assuming that suitable sources of voltage are available for application between the X matrix and the Y matrix selection busses, in a manner known in the computer art. Current flowing through a winding 60 in one direction magnetizes its associated toroid 62 in one direction, and current flowing through the same winding 60 in an opposite direction magnetizes the toroid 62 in an opposite direction. Thus, the toroids 62 are used to store information in a computer memory.

From the foregoing description, it will be apparent that there has been provided an improved integrated circuit for a switching matrix wherein a single array of similar diodes is connected to provide current selectively in either one of two directions to a winding. While only one embodiment of the invention has been described and illustrated, variations in the circuitry and integrated structure, all coming within the spirit of this invention, will, no doubt, readily suggest themselves to those skilled in the art. Hence, it is desired that the foregoing shall be considered as illustrative and not in a limiting sense.

What is claimed is:

1. An array of semiconductor diodes disposed in a matrix, said array being fixed in a sheet-like form with opposed major surfaces, each of said diodes having an electrode exposed on each of said surfaces, some of said diodes having their cathode electrodes exposed on one of said surfaces and others of said diodes having their anode electrodes exposed on said one surface, means on one of said major surfaces connecting predetermined groups of similarly poled electrodes together, and means on the other one of said major surfaces connecting pairs of dissimilarly poled electrodes together.

2. An array of semiconductor diodes disposed in a matrix of columns and rows, insulating material binding said array of diodes together and forming therewith a wafer with opposed major surfaces, each of said diodes having a separate electrode exposed on each of said major surfaces, respectively, said diodes in each odd-numbered column having their cathode electrodes exposed on one of said surfaces and said diodes in each even-numbered column having their anode electrodes exposed on said one surface, means on one of said major surfaces connecting predetermined groups of similarly poled electrodes together, and means on the other of said major surfaces connecting pairs of dissimilarly poled electrodes together.

3. An array of semiconductor diodes disposed in a matrix of columns and rows, insulating material binding said array in a sheet-like form with opposed major surfaces, each of said diodes having a separate electrode exposed on each of said major surfaces, respectively, said diodes in each even-numbered column having their cathode electrodes exposed on one of said surfaces and said diodes in each odd-numbered column having their anode electrodes exposed on said one surface, separate means for each of said columns on one of said major surfaces connecting predetermined groups of similarly poled electrodes together, and separate means for predetermined adjacent pairs of diodes in each row on the other one of said major surfaces connecting pairs of dissimilarly poled electrodes together.

4. An integrated circuit comprising a composite wafer of a matrix of semiconductor diodes arranged in columns and rows and insulated from each other, each of said diodes comprising semiconductor material of opposite conductivity types forming a P-N junction, each of said diodes in each odd-numbered column having semiconductor material of one conductivity type exposed on one major surface of said wafer and semiconductor material of an opposite conductivity type exposed on the opposite major surface of said wafer, each of said diodes in each even-numbered column having semiconductor material of said opposite conductivity type exposed on said one major surface of said wafer and semiconductor material of said one conductivity type exposed on said opposite major surface of said wafer, separate connecting means for separate pairs of said diodes in each row on one major surface of said wafer electrically connecting said semiconductor material of said one conductivity type of each diode in each odd-numbered column to said semi-conductor material of said opposite conductivity type of each diode in each adjacent even-numbered column, separate means electrically connecting said semi-conductor material of said opposite conductivity type in each of said diodes on said opposite major surface of said wafer in each of said odd-numbered columns, respectively, and separate means electrically connecting each of said semiconductor material of said one conductivity type in each of said diodes in each of said even-numbered columns on said opposite major surface of said wafer, respectively.

5. An integrated circuit comprising a composite wafer of a matrix of semiconductor diodes arranged in columns and rows, each of said diodes being electrically insulated from each other in said wafer, each of said diodes comprising semiconductor material of opposite conductivity types forming a P-N junction, each of said diodes in each odd-numbered column having semiconductor material of one conductivity type exposed on one major surface of said wafer and semiconductor material of an opposite conductivity type exposed on the opposite major surface of said wafer, each of said diodes in each even-numbered column having semiconductor material of said opposite conductivity type exposed on said one major surface of said wafer and semiconductor material of said one conductivity type exposed on said opposite major surface of said wafer, separate means for separate pairs of said diodes in each row on said one major surface of said wafer electrically connecting said semiconductor material of said one conductivity type of each diode in each odd-numbered column to said semiconductor material of said opposite conductivity type of each diode in each adjacent even-numbered column.

separate means on said opposite major surface of said wafer electrically connecting all of said semiconductor material of said opposite conductivity type in each of said diodes in each of said odd-numbered columns, respectively, and separate means on said opposite major surface of said wafer electrically connecting each of said semiconductor material of said one conductivity type in each of said diodes in each of said even-numbered columns, respectively.

said semiconductor material of one conductivity type being silicon doped with an electron acceptor or donor element and said semiconductor material of an opposite conductivity type being said silicon doped with an electron donor or acceptor element, respectively.

6. An integrated circuit comprising a matrix of diodes arranged in columns and rows, means fixing said matrix of diodes in a wafer, said diodes having opposite sides exposed on opposite major surfaces of said wafer, said diodes in the odd-numbered columns of said matrix having an anode exposed on one of said sides on one major surface of said wafer and a cathode exposed on the other of said sides on the opposite major surface of said wafer, said diodes in the even-numbered columns having a cathode exposed on said one major surface of said wafer and an anode exposed on said opposite major surface of said wafer, a separate electrical connection for separate pairs of said diodes in each row on said one major surface of said wafer connecting said anode of each diode in an odd-numbered column to said cathode of each diode in an adjacent even-numbered column, a separate conductor for each odd-numbered column on said opposite major surface of said wafer connecting said cathodes of each of said diodes in each of said odd-numbered columns, respectively, and a separate conductor for each even-numbered column on said opposite major surface connecting said anodes of each of said diodes in each of said even-numbered columns.

7. An integrated circuit comprising a matrix of diodes arranged in columns and rows, means fixing said matrix of diodes in a wafer and insulating said diodes from each other, said diodes having opposite sides exposed on opposite major surfaces of said wafer, said diodes in the odd-numbered columns of said matrix having a cathode exposed on one of said sides on one major surface of said wafer and an anode exposed on the other of said sides on the opposite major surface of said wafer, said diodes in the even-numbered columns having an anode exposed on said one major surface of said wafer and a cathode exposed on said opposite major surface of said wafer, a separate electrical connection for each pair of adjacent diodes in each row on said one major surface of said wafer connecting said cathode of each diode in an odd-numbered column to said anode of each diode in an adjacent even-numbered column, a separate conductor in each of said odd-numbered columns connecting said anodes of each of said diodes in each of said odd-numbered columns, respectively, and a separate conductor in each of said even-numbered columns connecting said cathodes of each of said diodes in each of said even-numbered columns.

8. A matrix of semiconductor diodes arranged in columns and rows, insulating and binding means disposed between said diodes to form a composite wafer therewith, said wafer having opposite major surfaces, each diode in each odd-numbered column comprising an anode exposed on one major surface of said wafer and a cathode exposed on the opposite major surface of said wafer, each of said diodes in the even-numbered columns having a cathode exposed on said one major surface of said wafer and an anode exposed on said opposite major surface of said wafer, means in each row on said one major surface of said wafer comprising a separate conductor for each pair of diodes in each row to connect an anode of a diode in an odd-numbered column to a cathode in an adjacent even-numbered column, whereby to connect pairs of adjacent diodes in series with each other, and means including a separate conductor for each column to connect said cathodes in each odd-numbered column and said anodes in each even-numbered column, respectively.

9. A matrix of semiconductor diodes arranged in columns and rows, insulating and binding means disposed between said diodes to form a composite wafer therewith, each wafer having opposite major surfaces, each diode in each odd-numbered column comprising a cathode exposed on one major surface of said wafer and an anode exposed on the opposite major surface of said wafer, each of said diodes in the even-numbered columns having an anode exposed on said one major surface of said wafer and a cathode exposed on said opposite major surface of said wafer, means in each row on said one major surface of said wafer comprising a separate conductor for each pair of diodes in each row to connect a cathode of a diode in one column to an adjacent anode in an adjacent column whereto to connect pairs of adjacent diodes in series with each other, and separate means for each column on said opposite major surface of said wafer including a separate conductor for each column to connect said anodes in each odd-numbered column and said cathodes in each even-numbered column, respectively.

10. In a system wherein it is desirable to have current flow selectively in an element in either of two directions, a matrix of semiconductor diodes.

means electrically insulating and binding said diodes in said matrix and forming a composite wafer therewith, said diodes in said matrix being arranged in columns and rows, said wafer having opposite major surfaces, an anode of each of said diodes in each odd-numbered row being exposed on one of said major surfaces of said wafer, and a cathode of each of said diodes in the even-numbered rows also being exposed on said one major surface of said wafer, a cathode of each of said diodes in said odd-numbered columns being exposed on said opposite major surfaces of said wafer, and an anode of each of said even-numbered columns also being exposed on said opposite major surface of said wafer, a separate conductor for connecting said cathodes of each of said diodes in each of said odd-numbered columns, respectively, a separate conductor for connecting each of said cathodes in each of said even-numbered columns, respectively, a separate conductor for each pair of diodes connecting each pair of adjacent diodes in each of said rows, and means connecting at least one of said last-mentioned conductors to said element.

11. In a system wherein it is desirable to have current flow selectively in a winding in either of two directions, a matrix of semiconductor diodes, means electrically insulating and binding said diodes in said matrix and forming a composite wafer therewith, said diodes in said matrix being arranged in columns and rows, said wafer having opposite major surfaces, a cathode of each of said diodes in each odd-numbered row being exposed on one of said major surfaces of said wafer, and an anode of each of said diodes in the even-numbered rows also being exposed on said one major surface of said wafer, an anode of each of said diodes in said odd-numbered columns being exposed on said opposite major surfaces of said wafer, and a cathode of each of said even-numbered columns also being exposed on said opposite major surface of said wafer, a separate conductor for connecting said anodes of each of said diodes in each of said odd-numbered columns, respectively, a separate conductor for connecting each of said anodes in each of said even-numbered columns, respectively, a separate conductor connecting each pair of adjacent diodes in each of said rows, each of said last-mentioned conductors connecting one of said cathodes of one of said diodes in an odd-numbered column with one of said anodes of one of said diodes in said even-numbered column, and means connecting at least one of said last-mentioned conductors to said winding.

References Cited

UNITED STATES PATENTS

| | | | |
|---|---|---|---|
| 2,872,664 | 2/1959 | Minot | 340—174 |
| 3,011,156 | 11/1961 | MacPherson | 340—173 |
| 3,028,659 | 4/1962 | Chow et al. | 340—173 |
| 3,138,721 | 6/1964 | Kilby | 307—88.5 |
| 3,191,151 | 6/1965 | Price | 340—166 |
| 3,199,002 | 8/1965 | Martin | 307—88.5 X |
| 3,235,428 | 2/1966 | Naymik | 317—235 X |
| 3,280,386 | 10/1966 | Philips | 317—235 X |
| 3,290,760 | 12/1966 | Cave | 307—88.5 |
| 3,307,239 | 3/1967 | Lepselter et al. | 317—235 X |
| 3,321,745 | 5/1967 | Mansuetto et al. | 340—166 |

STANLEY M. URYNOWICZ, Jr., *Primary Examiner.*